United States Patent
Dannamaneni et al.

(10) Patent No.: US 10,609,206 B1
(45) Date of Patent: Mar. 31, 2020

(54) AUTO-REPAIRING MOBILE COMMUNICATION DEVICE DATA STREAMING ARCHITECTURE

(71) Applicant: Sprint Communications Company L.P., Overland Park, KS (US)

(72) Inventors: Prashanth Dannamaneni, Merriam, KS (US); Rakesh A. Surendra, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 431 days.

(21) Appl. No.: 15/650,849

(22) Filed: Jul. 15, 2017

(51) Int. Cl.
| | | |
|---|---|---|
| *G06F 15/173* | (2006.01) | |
| *H04M 1/725* | (2006.01) | |
| *H04W 4/02* | (2018.01) | |
| *H04W 8/22* | (2009.01) | |
| *H04L 29/06* | (2006.01) | |
| *H04N 21/24* | (2011.01) | |
| *H04L 12/26* | (2006.01) | |
| *H04L 12/801* | (2013.01) | |

(52) U.S. Cl.
CPC .... *H04M 1/72569* (2013.01); *H04L 43/0882* (2013.01); *H04L 47/15* (2013.01); *H04L 65/60* (2013.01); *H04M 1/72577* (2013.01); *H04N 21/2408* (2013.01); *H04W 4/02* (2013.01); *H04W 8/22* (2013.01)

(58) Field of Classification Search
None
See application file for complete search history.

(56) References Cited

U.S. PATENT DOCUMENTS

| | | | | |
|---|---|---|---|---|
| 8,112,485 B1* | 2/2012 | Cooley | ............... | G06Q 10/107 709/206 |
| 8,839,417 B1* | 9/2014 | Jordan | ............... | H04L 63/0227 726/22 |
| 2007/0118344 A1* | 5/2007 | Bolt | ................... | G05B 23/0254 703/2 |
| 2008/0077995 A1* | 3/2008 | Curnyn | .............. | H04L 63/1416 726/27 |
| 2009/0216883 A1* | 8/2009 | Fellenstein | .......... | G06F 9/5011 709/224 |
| 2009/0260087 A1* | 10/2009 | Ishida | ................ | H04L 63/0245 726/25 |
| 2013/0018967 A1* | 1/2013 | Gannu | ............... | G06F 16/9574 709/206 |
| 2014/0047106 A1* | 2/2014 | Leung | .................... | H04L 43/08 709/224 |

(Continued)

*Primary Examiner* — Tonia L Dollinger
*Assistant Examiner* — Ishrat Rashid (57) ABSTRACT

A method of adapting content distribution. The method comprises receiving a stream of data from a plurality of sources by a computer system, storing the stream of data in a message queueing system executed on the computer system, and analyzing the stream of data based on a model of data content by the computer system, where the model is developed automatically based on training the model with historic data. The method further comprises based on the analysis of the stream of data using the model, adapting the information in the stream of data and after adapting the information in the stream of data, processing the data by a processing system executed on the computer system, where the processing comprises storing at least some of the data in a data store.

20 Claims, 4 Drawing Sheets

(56) References Cited

U.S. PATENT DOCUMENTS

| | | | |
|---|---|---|---|
| 2015/0254328 A1* | 9/2015 | Dereszynski | G06Q 30/0277 707/739 |
| 2016/0036837 A1* | 2/2016 | Jain | H04L 63/1416 726/23 |
| 2017/0208083 A1* | 7/2017 | Gurney, III | H04L 63/101 |
| 2017/0214702 A1* | 7/2017 | Moscovici | H04L 63/1416 |
| 2019/0081876 A1* | 3/2019 | Ghare | H04L 63/1425 |

* cited by examiner

AUTO-REPAIRING MOBILE COMMUNICATION DEVICE DATA STREAMING ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems may generate large flows of data. Different computers within the computer system may be used to implement architectural layers of a composite data flow, where the data may flow from a data source to a first layer, from the first layer to a second layer, from the second layer to other layers and ultimately to a final layer. Some of the layers may provide a message queueing function to decouple a lower layer from a higher layer, so the two layers need not synchronize to coordinate the flow of data. For example, a lower layer may push a message to the message queue, where the message comprises some data or information to be processed by a higher layer. The higher layer retrieves the message from the message queue when it is ready to process it. If the message queue is empty, the higher layer waits until another message is available. In this way the lower layer does not have to handshake with the higher layer to pass messages.

SUMMARY

In an embodiment, a method of adapting content distribution is disclosed. The method comprises receiving a stream of data from a plurality of sources by a computer system, where the data comprises information about a mobile communication device location, a uniform resource locator (URL) accessed by a mobile communication device, a mobile communication device data session connection event, a mobile communication device data session disconnection event, a mobile communication device launch of a mobile application, a mobile communication device mobile application download event, or a combination thereof, storing the stream of data in a message queueing system executed on the computer system, and analyzing the stream of data based on a model of data content by the computer system, where the model is developed automatically based on training the model with historic data. The method further comprises, based on the analysis of the stream of data using the model, adapting the information in the stream of data, and, after adapting the information in the stream of data, processing the data by a processing system executed on the computer system, where the processing comprises storing at least some of the data in a data store, whereby content distribution based on the data in the data store is performed based on data that is groomed of erroneous data.

In another embodiment, a method of adapting content distribution is disclosed. The method comprises receiving a stream of data from a plurality of sources by a computer system, where the data comprises information about a mobile communication device location, a uniform resource locator (URL) accessed by a mobile communication device, a mobile communication device data session connection event, a mobile communication device data session disconnection event, a mobile communication device launch of a mobile application, a mobile communication device mobile application download event, or a combination thereof, storing the stream of data in a message queueing system executed on the computer system, and analyzing the stream of data based on a model of data content by the computer system, where the model is developed automatically based on training the model with historic data. The method further comprises, based on the analysis of the stream of data using the model, eliminating one of the sources of data from the stream of data based on that source providing erroneous data and, after eliminating the one of the sources of data from the stream of data, processing the data by a processing system executed on the computer system, where the processing comprises storing at least some of the data in a data store, whereby content distribution based on the data in the data store is performed based on data that is groomed of erroneous data.

In yet another embodiment, a method of adapting content distribution is disclosed. The method comprises receiving a stream of data from a plurality of sources by a computer system, where the data comprises information about a mobile communication device location, a uniform resource locator (URL) accessed by a mobile communication device, a mobile communication device data session connection event, a mobile communication device data session disconnection event, a mobile communication device launch of a mobile application, a mobile communication device mobile application download event, or a combination thereof, storing the stream of data in a message queueing system executed on the computer system, and analyzing the stream of data based on a model of data content by the computer system, where the model is developed automatically based on training the model with historic data. The method further comprises, based on the analysis of the stream of data using the model, eliminating one of the sources of data from the stream of data based on that source providing erroneous data and, after eliminating the one of the sources of data from the stream of data, processing the data by a processing system executed on the computer system, where the processing comprises storing at least some of the data in a data store. The method further comprises monitoring data supplied by the eliminated source of data, where the monitored data is not processed with the data of the stream of data, analyzing the monitored data using the model of data content by the computer system, and, based on the analysis of the monitored data, returning the eliminated source of data to the stream of data that is processed by the processing system, whereby content distribution based on the data in the data store is performed based on data that is groomed of erroneous data.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Data in the form of events generated by mobile communication devices may be received and analyzed by a computer system to determine trends and patterns of user behavior. For example, user profiles may be constructed from the analysis of device event data and used to accurately target content such as advertisements to the users based on these user profiles. The event data generated by these devices, however, generates a very large real-time stream of communication traffic and data flows that pose several technological challenges. A wireless communication service provider, for example, may provide wireless service to about 50 million mobile communication devices and receive event messages many times per day from each of those 50 million devices.

One problem that occurs is that some of the data is erroneous. It is desirable to identify erroneous data as it is streamed and take appropriate action in-stream rather than after the data has been processed. Such processing may involve storing event data in cloud storage. Because such cloud storage may cost money (e.g., third party provided cloud storage), storing erroneous data only to delete it later wastes money. Further, the erroneous data may perturb the analysis of the data and lead to less accurate results or conclusions (e.g., a "garbage in, garbage out" phenomenon). Such errors can happen systematically and continue indefinitely. For example, a mobile application installed on devices may provide event data that includes location information but use default location information, such as null fields or constant location information such as 0 latitude, 0 longitude location coordinates. As another example, event data that includes time-date information may include default time information such as null fields or constant time-date information such as midnight Jan. 1, 1970. Other errors are experienced, also, such as disparate information such as SQL injection (e.g., a SQL query intercalated into a JSON file).

Data may be provided to the computer system from a number of different sources, for example up to 30 different sources. An appropriate action may be to blacklist a source that is sourcing erroneous data, for example blocking inflows of messages from the blacklisted source at a firewall of the wireless service provider. Another appropriate action may be to interwork with the data source in an off-line manner (e.g., manual human-to-human discourse) to identify the issue and determine a work-around. In some cases, payment to the data source that is originating erroneous data may be withheld. Another appropriate action may be to redirect data from such a blacklisted source to a segregated storage partition for further processing, for example to extract the good portion of the data while discarding the erroneous portion of the data. Another appropriate action may be monitoring the redirected data from a blacklisted source and determining if the erroneous data is cleaned up in succeeding data messages. If the data from the blacklisted source is deemed to have remediated its error, it may be un-blacklisted and the data from that source may be redirected to the normal data stream pathway.

In an embodiment, the system comprises a messaging queue system that receives the data messages from the plurality of sources and a processing system executing processing applications that picks the data messages up from the message queues and processes it. In some cases, this processing may simply involve picking up the data messages, extracting the data from the data messages, and storing the data in storage (e.g., cloud storage or other). Other systems may then retrieve the data from the storage and process further. In other cases, however, the processing may extract the data, summarize the data, and store the summaries of data in storage. The present disclosure teaches an error monitoring application within the processing system that examines the data messages before providing them to the processing applications. The error monitoring application scores the data of each data message based on a model that has been algorithmically determined. When the score exceeds a predefined threshold, the data is deemed erroneous and discarded or stored in a segregated error data storage area or partition. By doing this, the further processing of the streamed data therefore does not process the errored data (because it has been removed from the data stream) and the storage of processed data does not store the errored data because it was not processed, thereby saving costs.

The model may be built and maintained using training data. Data collected by the real-time data streaming system may be analyzed to identify normal data and erroneous data. A sub-set of the data may be used to train the model. Once trained, a second-sub-set of the data may be used to test the accuracy of the model. The model may be successively trained and tested a plurality of times until the accuracy of the model achieves a desired quality criteria or a configurable number of training iterations is completed. The model may be retrained periodically, for example once a quarter, twice a year, once a year, or on some other interval of time. The periodic retraining may be performed based on data collected and analyzed to identify normal data and erroneous data collected since the previous model training iteration.

Figure 1:
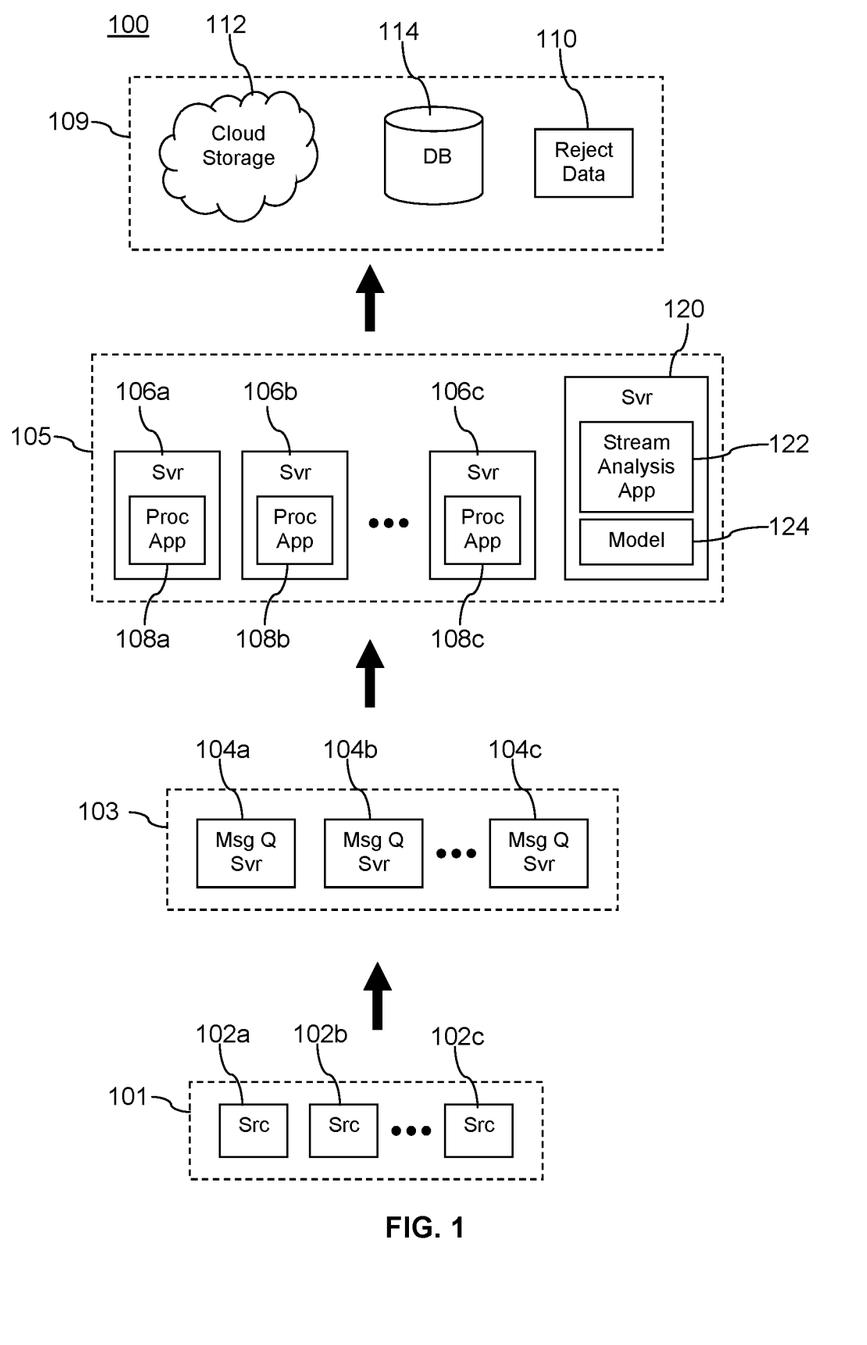
FIG. 1 is a block diagram of a communication system according to an embodiment of the disclosure.

Turning now to FIG. 1, a system 100 is described. In an embodiment, system 100 comprises a data sourcing layer 101 comprising a plurality of data sources 102, for example a first data source 102a, a second data source 102b, and a third data source 102c. While three data sources 102 are illustrated in FIG. 1, it is understood that there may be any number of data sources in the data sourcing layer 101. In an embodiment, the data sourcing layer 101 may comprise about 30 different data sources 102. The data sources 102 feed data messages up to a message queue layer 103 or message queue system. In an embodiment, the data messages transmitted by the data sources 102 may be received by a load balancer (not shown) and distributed to message queue servers 104 in the message queue layer 103 to equitably distribute the message queueing load. The message queue layer 103 comprises a plurality of message queue servers 104, for example a first message queue server 104a, a second message queue server 104b, and a third message queue server 104c. While three message queue servers 104 are illustrated in FIG. 1, it is understood that the message queue layer 103 may comprise any number of message queue servers 104. In an embodiment, the message queue layer 103 may be implemented using Kafka, RabbitMQ, ActiveMQ, or some other message queueing technology.

The system 100 further comprises a processing layer 105 or a processing system. The processing layer 105 comprises a plurality of processing servers 106 each executing a processing application 108. In an embodiment, the processing layer 105 may be implemented using Storm, Spark, SamSA, Pulsar, or some other real-time processing technology.

Each processing application 108 retrieves data messages from the message queue layer 103, processes the data message, and stores the results in a storage layer 109. The processing performed by the processing application 108 may extract the data content portion of the data message and store it in the storage layer 109, for example in a cloud storage 112 or in a data store 114. Alternatively, the processing application 108 may extract the data content portion of the data message and further process the data, for example building counts of events and storing the counts in the storage layer 109. This further processing of the data content may be referred to as summarizing or aggregating the raw data. The processing layer 105 may comprise a first processing server 106a executing a first processing application 108a, a second processing server 106b executing a second processing application 108b, and a third processing server 106c executing a third processing application 108c. While three processing servers 106 are illustrated as part of the processing layer 105, it is understood that the processing layer 105 may comprise any number of processing servers 106. Additionally, while each processing server 106 is illustrated as executing a single processing application 108, in an embodiment at least some of the processing servers 106 may execute two or more instances of processing applications 108.

The processing layer 105 further comprises a stream analysis server 120 that executes a stream analysis application 122 that evaluates data messages based on a model 124. While one stream analysis server 120 is shown as part of the processing layer 105, it is understood that the processing layer 105 may comprise any number of stream analysis servers 120. Before a data message is processed by the processing application 108 it is first evaluated by the stream analysis application 122. If the data message is deemed to be acceptable, it is passed on to the processing application 108 and processed accordingly. If the data message is deemed to be erroneous, it is not passed on to the processing application 108 and is removed from the stream of data flow. In an embodiment, the erroneous data message may be stored in a rejected data store 110. Alternatively, in an embodiment, the erroneous data message may be discarded and eliminated from the system 100. In either case, however, the data message deemed to be erroneous is not processed by the processing application 108 and does not infiltrate into the cloud storage 112 or the data store 114. Because it is the further analysis of the data in the cloud storage 112 and/or the data store 114 that provides value from the data messages received from the data sources 102, the effect of the elimination of erroneous data messages by the stream analysis application 122 is to groom the real-time data stream and to improve the general quality of the remaining data or the groomed data. Using groomed data to identify trends and to build profiles of users of mobile communication devices can be expected to provide more accurate results. The mobile communication devices may be mobile phones, smart phones, personal digital assistants (PDAs), wearable computers, headset computers, laptop computers, and/or tablet computers, notebook computers.

The stream analysis application 122 may parse the data content of a data message and score each component of the data message (e.g., each field or each parameter) based on the model 124. Each component of the data message may be expected to contain a normative value of a value that fits within a normal range of values. Each component may have a weight assigned to it by the model 124, whereby any deviations from the normal values of a given parameter are emphasized or deemphasized. A sum is taken over all the evaluated parameters, and the sum or score is compared to a threshold. If the score exceeds the threshold (or possibly is less than the threshold, depending on the polarity chosen for the calculations and evaluations), the subject data message is deemed erroneous and may be discarded or stored in the rejected data store 110.

In an embodiment, the stream analysis application 122 may parse the data content of a data message, excise erroneous data (e.g., a part of the data message that scores poorly against the model while other parts of the data message score well against the model), and regenerate the data message without the erroneous part. This reconstituted data message, purged of the erroneous part, may then be handed off to processing applications 108 for processing. Alternatively, the stream analysis application 122 may replace a data part that scores poorly against the model with valid data or with data known to be typical. This kind of reforming of errored data messages may be referred to in some contexts as correcting errors in the streamed data.

The stream analysis application 122 may maintain counts of rejected data messages associated with each of the sources 102. If a source 102 has generated an excessive number of erroneous data messages per a unit of time, the stream analysis application 122 may black list the subject source 102, for example invoking an application programming interface (API) of a firewall located between the source layer 101 and the message queue layer 103 whereby further data messages from the subject source 102 may be blocked by the firewall. Alternatively, the stream analysis application 122 may notify an administrator of the system 100, and the administrator may take the action of blacklisting the subject source in the firewall. It is understood that blacklisting a source 102 may entail adding an Internet protocol (IP) address of the subject source 102 to a list of restricted servers or hosts that the firewall will not pass data packets from into the message queue layer 103 (or to any host within the domain mediated by the firewall).

The stream analysis application 122 may monitor the functioning of the message queue layer 103 and the processing layer 105 and adapt or tune the servers 104, 106. For example, the stream analysis application 122 may increase the queue depth or decrease the queue depth of the message queue servers 104, may increase or decrease the number of message queue brokers on the message queue servers 104, may increase or decrease the number of servers 106, may vary the size of batching of data provided by the sources 102. The stream analysis application 122 may maintain on-going performance metrics for the processors and memory of the servers 104, 106 as well as the depth of the queues maintained on the messaging queue servers 104 and iteratively adapt the configuration of the message queueing layer 103 and the processing layer 105 to achieve predefined performance targets.

For example, a processor utilization of one or more servers 104, 106, 120 may be monitored and the numbers of servers 104, 106 may be increased or decreased. In an embodiment, the message queue servers 104 and/or the processing servers 106 may be virtual servers that may be elastically increased or decreased in number, as loads on the layers 103, 105 change. Increasing servers may be accomplished by allocating additional virtual computing resources; decreasing servers may be accomplished by deallocating virtual computing resources. In a like manner, memory utilization of the layers 103, 105 may be monitored and virtual storage resources elastically increased or decreased in size. Increasing virtual storage resources or virtual memory may be accomplished by allocating additional virtual memory storage blocks; decreasing virtual storage resources may be accomplished by deallocating virtual memory storage blocks.

Figure 2:
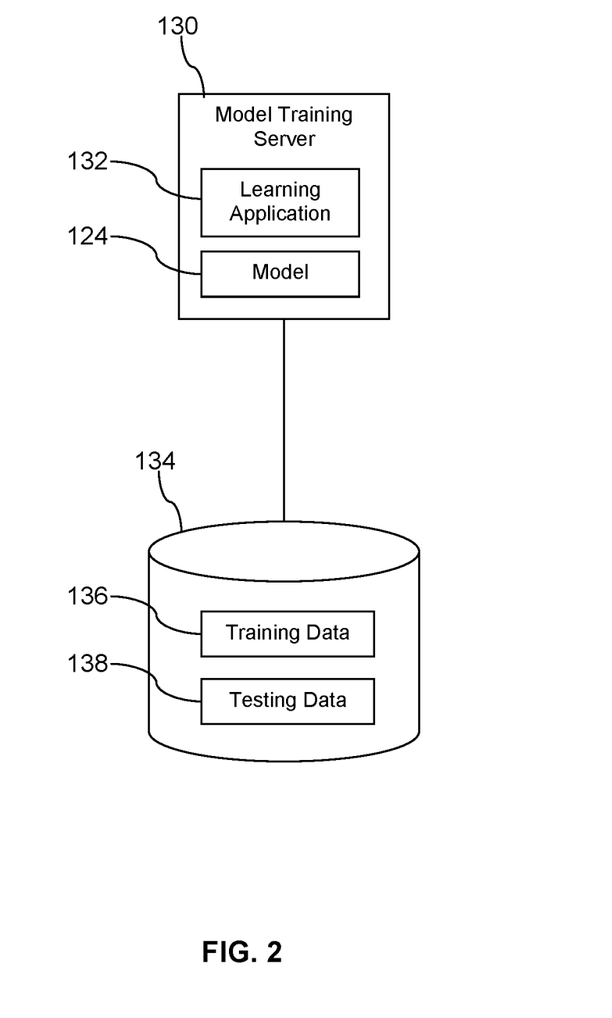
FIG. 2 is a block diagram of a model training computer system according to an embodiment of the disclosure.

Turning now to FIG. 2, further details of training the model 124 are described. In an embodiment, the model 124 is trained off-line (e.g., in a computer system not actively involved in processing the real-time data message stream). A model training server 130 executes a learning application 132 that creates and/or adapts the model 124 algorithmically. The learning application 132 accesses training data store 134 to obtain training data 136 that it uses to train the model 124 and to obtain testing data 138 that is uses to test the model 124 after an iteration of training. The training data 136 and the testing data 138 may be selected manually from data messages that have been received by the message queueing system 103. The data 136, 138 may be referred to in some contexts as historical data. By segregating training data 136 from testing data 138, the risk of "over training" the model (optimizing the model for a specific set of training data that is not representative of "real world" data) may be mitigated.

Figure 3:
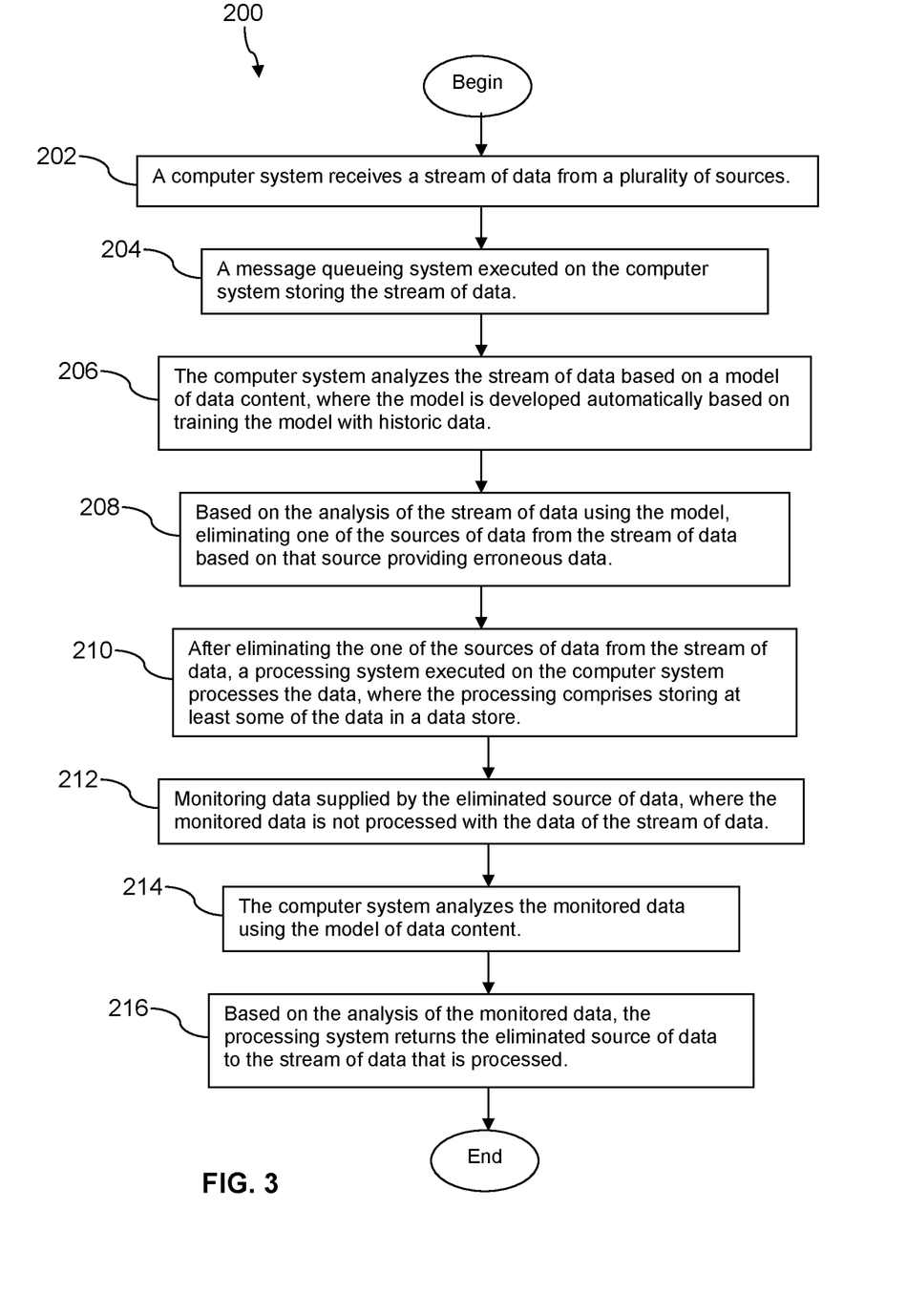
FIG. 3 is a flow chart of a method according to an embodiment of the disclosure.

Turning now to FIG. 3, a method 200 is described. In an embodiment, method may be used for adapting content distribution. At block 202, a computer system receives a stream of data from a plurality of sources. In an embodiment, the message queue layer 103, executing on the computer system (e.g., servers 104) receives the stream of data. The data may comprise information about a mobile communication device location, a uniform resource locator (URL) accessed by a mobile communication device, a mobile communication device data session connection event, a mobile communication device data session disconnection event, a mobile communication device launch of a mobile application, a mobile communication device mobile application download event, or a combination thereof. The sources of the streamed data may comprise a plurality of server computers that funnel data from a large number of mobile communication devices into the computer system. The sources of the streamed data may comprise server computers of third parties that collect data and send it to the computer system, for example data collection services or data mining services such as financial institutions. The mobile communication devices may be mobile phones, smart phones, personal digital assistants (PDAs), wearable computers, headset computers, laptop computers, tablet computers, and/or notebook computers.

At block 204, a message queueing system executed on the computer system stores the stream of data. For example, the messaging queueing system 103 may store the data in a plurality of message queues maintained by the message queue servers 104. At block 206, the computer system analyzes the stream of data based on a model of data content, where the model is developed automatically based on training the model with historic data. For example, the stream analysis application executing on the server 120 analyses the stream of data based on the model 124. This analysis may involve calculating a score for data based on the model, where a score that passes a threshold is deemed bad data. At block 208, based on the analysis of the stream of data using the model, one of the sources of data is eliminated from the stream of data based on that source providing erroneous data. For example, the source of erroneous data may be identified on a blacklist used by a firewall mediating access of the data sources to the computer system. This may involve entering an IP address or a domain address of the source of erroneous data into the blacklist. Removing one of the sources of data may be referred to as automatically repairing the data stream.

Alternatively, in an embodiment, the processing of block 208 may adapt the information in data provided by the erroneous source of data. For example, the erroneous data component may be given a meaningful value based on other known factors. For example, the erroneous data component may be excised from a data message and the data message (reconstituted without the erroneous data component) then passed on to a processing application 108 executing on a processing server 106 for normal processing. This may be referred to in some contexts as automatically repairing the data stream.

At block 210, after eliminating (or alternatively adapting) the one of the sources of data from the stream of data, a processing system executed on the computer system processes the data, where the processing comprises storing at least some of the data in a data store. At block 212, monitoring data supplied by the eliminated source of data, where the monitored data is not processed with the data of the stream of data. Monitoring the data supplied by the eliminated source of data may be directed to determining if the source of data remediates its problem and stops sending erroneous data. At block 214, the computer system analyzes the monitored data using the model of data content. At block 216, based on the analysis of the monitored data, returning the eliminated source of data to the stream of data that is processed by the processing system. For example, if the eliminated source of data is found to have remediated its problem and begins sending good quality data, it may be removed from the blacklist and no longer blocked from streaming data into the system 100. The processing of method 200 may promote improved content distribution based on the data in the data store, because that data is groomed of erroneous data. Said in other words, the analysis of the data in the data store which is used to drive content distribution performs more accurate analysis when the data is groomed of erroneous data.

Figure 4:
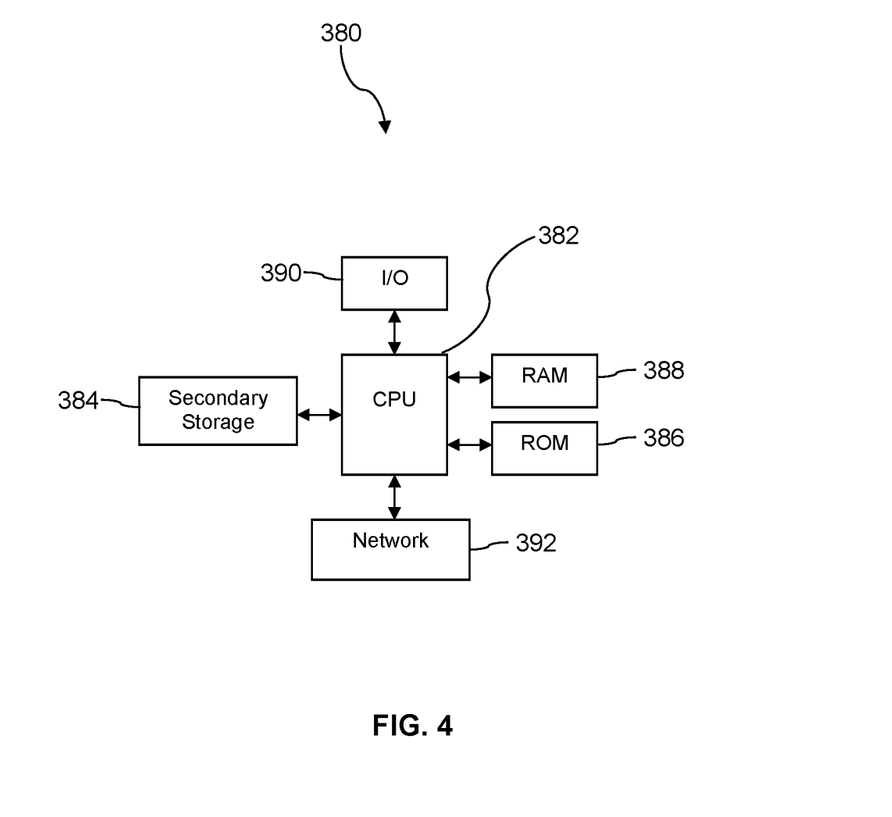
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of adapting content distribution, comprising:
    receiving a stream of data from a plurality of sources by a computer system, where the data comprises information about a mobile communication device location, a uniform resource locator (URL) accessed by a mobile communication device, a mobile communication device data session connection event, a mobile communication device data session disconnection event, a mobile communication device launch of a mobile application, a mobile communication device mobile application download event, or a combination thereof;
    storing the stream of data in a message queueing system executed on the computer system;
    analyzing the stream of data based on a model of data content by the computer system, where the model is developed automatically based on training the model with historic data;
    based on the analysis of the stream of data using the model, eliminating one of the sources of data from the stream of data based on that source providing erroneous data;
    after eliminating the one of the sources of data from the stream of data, processing the data by a processing system executed on the computer system, where the processing comprises storing at least some of the data in a data store;
    monitoring data supplied by the eliminated source of data, where the monitored data is not processed with the data of the stream of data;
    analyzing the monitored data using the model of data content by the computer system; and
    based on the analysis of the monitored data, returning the eliminated source of data to the stream of data that is processed by the processing system,
    whereby content distribution based on the data in the data store is performed based on data that is groomed of erroneous data.

2. The method of claim 1, wherein the model of data content comprises a plurality of weights.

3. The method of claim 1, wherein the mobile communication device is one of a mobile phone, a smart phone, a personal digital assistant (PDA), a wearable computer, a headset computer, a laptop computer, a tablet computer, or a notebook computer.

4. The method of claim 1, wherein eliminating the one of the sources of data from the stream of data comprises blacklisting a source of data that is associated with erroneous data.

5. The method of claim 4, wherein returning the eliminated source of data to the stream of data that is processed by the processing system comprises removing the source of data from a blacklist.

6. The method of claim 1, further comprising monitoring performance of the computer system and tuning resources of the computer system based on performance monitoring.

7. A method of adapting content distribution, comprising:
receiving a stream of data from a plurality of sources by a computer system, where the data comprises information about a mobile communication device location, a uniform resource locator (URL) accessed by a mobile communication device, a mobile communication device data session connection event, a mobile communication device data session disconnection event, a mobile communication device launch of a mobile application, a mobile communication device mobile application download event, or a combination thereof;
storing the stream of data in a message queueing system executed on the computer system;
analyzing the stream of data based on a model of data content by the computer system, where the model is developed automatically based on training the model with historic data;
based on the analysis of the stream of data using the model, eliminating one of the sources of data from the stream of data based on that source providing erroneous data; and
after eliminating the one of the sources of data from the stream of data, processing the data by a processing system executed on the computer system, where the processing comprises storing at least some of the data in a data store,
whereby content distribution based on the data in the data store is performed based on data that is groomed of erroneous data.

8. The method of claim 7, further comprising monitoring performance of the computer system and tuning resources of the computer system based on performance monitoring.

9. The method of claim 8, wherein the performance monitoring comprises monitoring a processor utilization of the computer system.

10. The method of claim 8, wherein the performance monitoring comprises monitoring memory utilization of the computer system.

11. The method of claim 8, wherein tuning resources of the computer system comprises allocating additional virtual computing resources.

12. The method of claim 11, wherein tuning resources of the computer system comprises deallocating virtual computing resources.

13. The method of claim 8, wherein tuning resources of the computer system comprises allocating additional virtual storage resources.

14. A method of adapting content distribution, comprising:
receiving a stream of data from a plurality of sources by a computer system, where the data comprises information about a mobile communication device location, a uniform resource locator (URL) accessed by a mobile communication device, a mobile communication device data session connection event, a mobile communication device data session disconnection event, a mobile communication device launch of a mobile application, a mobile communication device mobile application download event, or a combination thereof;
storing the stream of data in a message queueing system executed on the computer system;
analyzing the stream of data based on a model of data content by the computer system, where the model is developed automatically based on training the model with historic data;
based on the analysis of the stream of data using the model, adapting the information in the stream of data; and
after adapting the information in the stream of data, processing the data by a processing system executed on the computer system, where the processing comprises storing at least some of the data in a data store,
whereby content distribution based on the data in the data store is performed based on data that is groomed of erroneous data thereby avoiding needless costs of storing erroneous data.

15. The method of claim 14, wherein the mobile communication device is one of a mobile phone, a smart phone, a personal digital assistant (PDA), a wearable computer, a headset computer, a laptop computer, a tablet computer, or a notebook computer.

16. The method of claim 14, wherein analyzing the stream of data comprises determining a score of data based on the model and comparing the score to a predefined threshold value.

17. The method of claim 14, wherein adapting the information in the stream of data comprises correcting errors in the streamed data.

18. The method of claim 14, wherein adapting the information in the stream of data comprises blacklisting a source of data that is associated with erroneous data.

19. The method of claim 14, wherein the message queueing system is a Kafka message queueing system.

20. The method of claim 14, wherein the processing system is a storm processing system.

* * * * *